Dec. 1, 1942.  D. M. SOLENBERGER  2,303,798
PISTON RING
Filed July 30, 1940  2 Sheets-Sheet 1
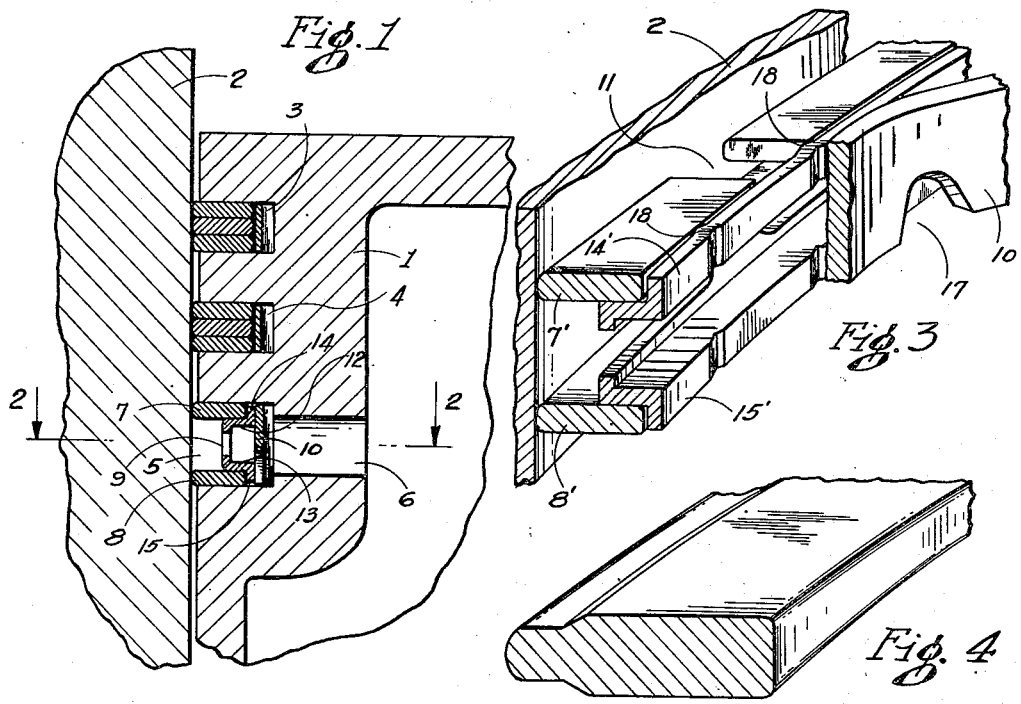
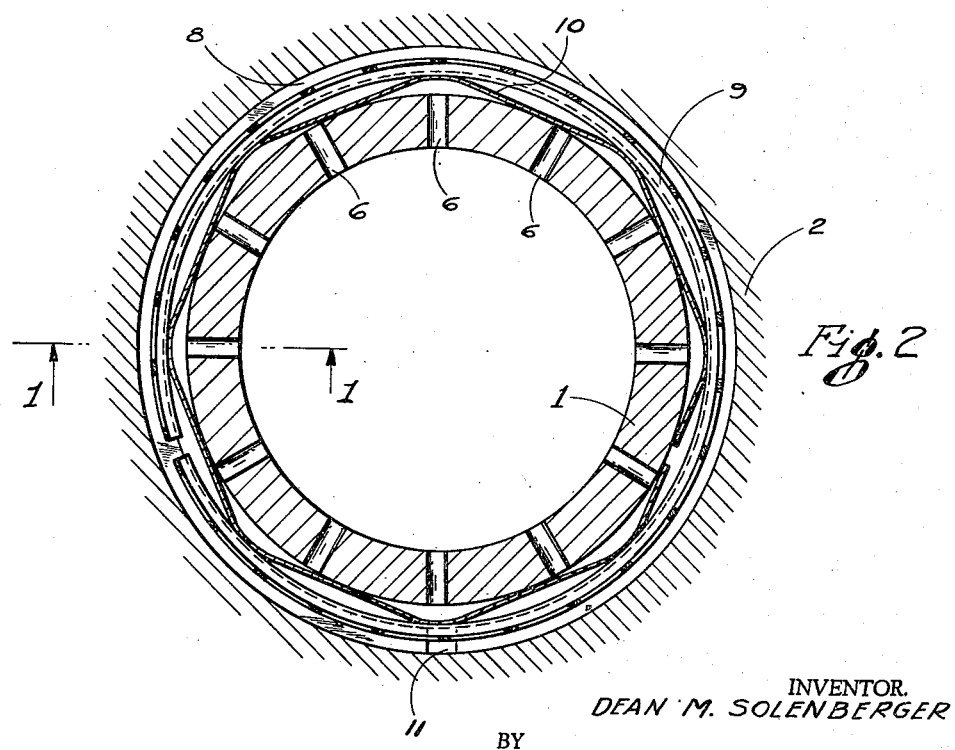
INVENTOR.
DEAN M. SOLENBERGER
BY
Richey & Watts
ATTORNEYS.

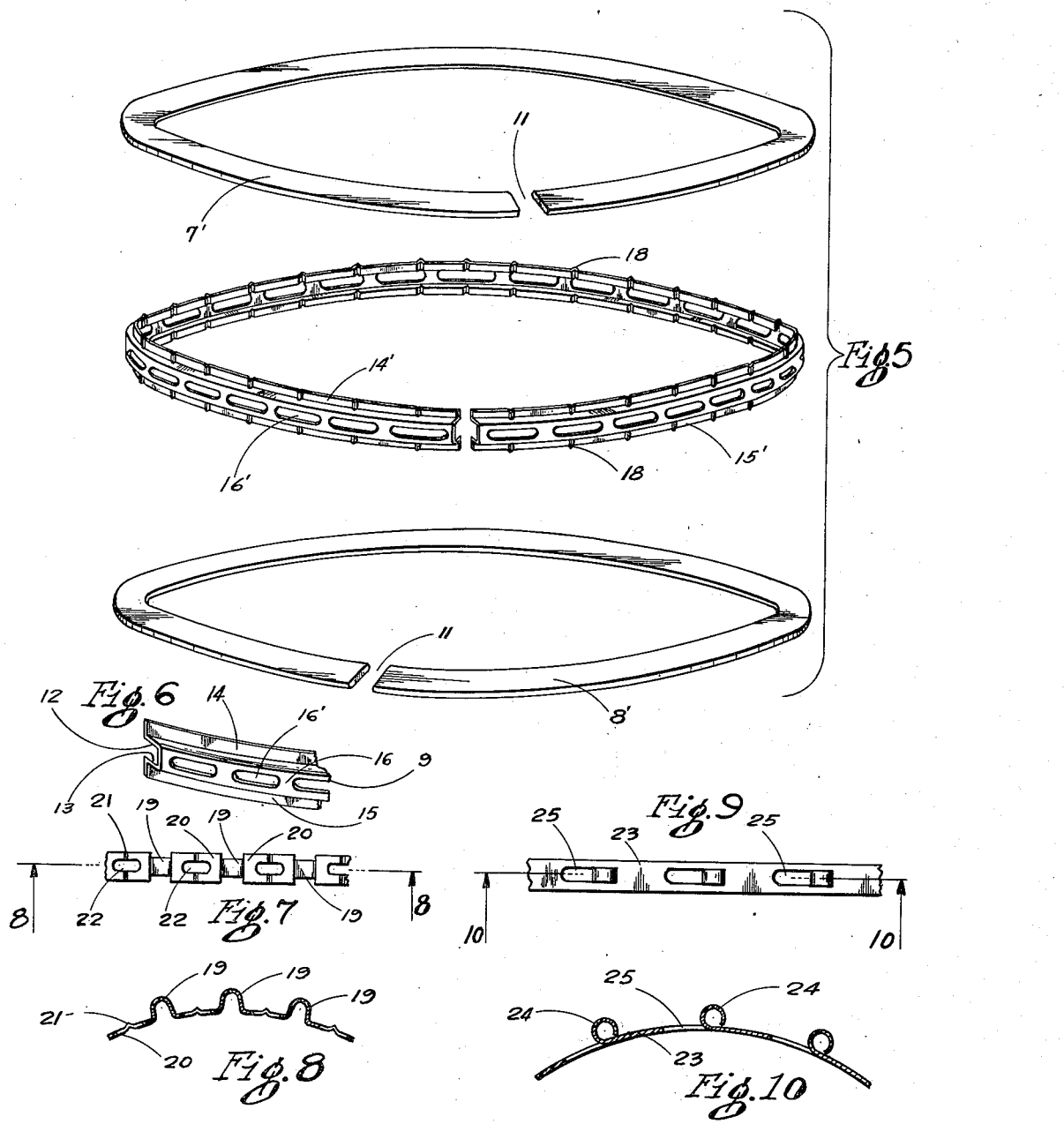

Patented Dec. 1, 1942

2,303,798

UNITED STATES PATENT OFFICE 2,303,798

PISTON RING

Dean M. Solenberger, Cleveland, Ohio, assignor to Simplex Products Corporation, Cleveland, Ohio, a corporation of Ohio Application July 30, 1940, Serial No. 348,422

1 Claim. (Cl. 309—45)

This invention relates to piston sealing devices and more particularly to an improved oil ring for the pistons of internal combustion engines.

In the usual internal combustion engine used in automotive engines the pistons are provided with a plurality of piston rings which effect the proper seal between the piston and the cylinder wall. In many pistons the upper ring or rings are the compression rings while the lower ring is an "oil ring" which serves to maintain the proper film of oil on the cylinder walls. The piston groove which accommodates the oil ring is provided with holes extending into the interior of the piston and various forms of rings have been employed in such grooves to scrape the oil from the cylinder walls and permit it to drain back into the crank case through the interior of the piston. It is to this type of oil drain ring that the present invention relates, and it is among the objects of my invention to provide an improved oil drain type of ring which will give long and effective service under severe usage conditions such as in trucks, tractors, busses, etc.

Other objects of my invention include: the provision of an oil ring which is particularly free from carbon accumulation and sticking in the ring groove; the provision of a piston ring which will cover a complete range of piston sizes from standard dimension to .060" oversize without shims or other compensating devices; the provision of a very light weight oil ring which will breathe rapidly during high speed action in tapered cylinders and at the same time have sufficient stability to prevent ring flutter or vibration; the provision of a substantially unbreakable piston ring which will withstand rough handling in installation and use and which is sufficiently flexible to be adapted readily to out-of-round cylinders; the provision of a piston ring, one size of which will meet substantially all conditions encountered in replacing piston rings in any given size cylinder, regardless of the conditions of wear of the cylinder, and which, when installed, will result in a greatly reduced oil consumption and blow-by in the engine; and the provision of an all-steel oil drain piston ring especially adapted to low cost manufacture and easily installable in an engine.

The above and other objects of my invention will appear from the following description of several embodiments thereof, reference being had to the accompanying drawings, in which—

Figure 1 is an enlarged fragmentary vertical cross-sectional view of a cylinder wall and a piston equipped with one of my improved oil drain rings.

Figure 2 is a horizontal cross-sectional view of the piston and ring shown in Figure 1 taken on line 2—2 of Figure 1.

Figure 3 is a fragmentary illustrative perspective view of a slightly modified form of my invention.

Figure 4 is a detached fragmentary enlarged view of a modified form of side rail ring.

Figure 5 is an exploded view of my improved piston ring assembly, the expander spring being omitted.

Figure 6 is a fragmentary perspective view of the flanged channel separator ring shown in Figures 1 and 2.

Figure 7 is a fragmentary elevational view of a modified form of separator ring.

Figure 8 is a horizontal cross-sectional view taken on line 8—8 of Figure 7.

Figure 9 is a fragmentary elevational view of another modified form of separator ring.

Figure 10 is a horizontal cross-sectional view taken on line 10—10 of Figure 9.

In Figure 1 the head of a piston is indicated at 1 and a portion of the cylinder wall is seen at 2. The two top ring grooves 3 and 4 are equipped with laminated rings of the type described and claimed in my U. S. Patent No. 2,068,115, but it will be understood that any desired form of compression ring may be employed. The bottom ring groove 5 is connected to the interior of the piston by the radially extending drain holes 6. My improved oil ring is disposed in the groove 5 and comprises a top side rail ring 7, a bottom side rail ring 8, a separator ring generally indicated at 9 and a notched or perforated corrugated expander spring 10.

It may be assumed that the following description relates to a piston ring for a Ford model 85 V-8 piston used in a cylinder having a $3\frac{1}{16}$" bore. The oil ring groove of such piston is $\frac{3}{16}$" in axial width and $\frac{5}{32}$" in radial depth and the dimensions given herein in referring to the parts of my ring may be considered to be typical for this size piston. It will be understood that for larger or smaller pistons, or piston ring grooves of different dimensions, the sizes of the parts will be changed accordingly but I prefer that approximately the same proportions between the parts be maintained.

The side rail rings 7 and 8 are preferably coiled from flat steel ribbon from .020" to .030" thick and from .10" to .105" in radial depth. The rings are split as seen at 11 in Figures 2 and 3 and are spaced apart and supported by the sides 12 and 13 of the flanged channel separator 9.

As is perhaps best seen in Figure 6, the separator shown in Figure 1 is formed with axially extending flanges 14 and 15 and a slotted web 16 which completes the channel section with the sides 12 and 13. The inner edges of the side rails 7 and 8 rest against and are engaged by the outer faces of the flanges 14 and 15 and the humps of the corrugated expander spring 10 engage the inner faces of the flanges 14 and 15 with a distributed radial pressure which, as seen in Figure 1, causes the outer edges of the side rail rings 7 and 8 to engage the cylinder wall 2.

The separator 9 is preferably formed of relatively thin, .012" to .014" thick, tempered steel and provides an extremely tough, substantially unbreakable, flexible light weight supporting and separating means for the spaced side rail rings 7 and 8. The perforations 16' in the web 16 of the separator permit oil which accumulates between the side rails 7 and 8 to pass back into the ring groove and eventually to escape through the radial holes 6. The corrugated expander 10 is provided with suitable openings, or notches 17, as illustrated, through which the oil may pass into the inner part of the ring groove and out through the holes 6. The thickness of the metal of the separator 9 is uniform throughout making it possible to produce these elements continuously by rolling and punching operations. The channel form of the separator gives the required strength and stiffness and, as will be further referred to later, the thin steel employed assists in preventing clogging of the oil drain holes 16' by carbon accumulation.

It will be understood that the outer edges of the side rails 7 and 8 may be square, rounded as shown in Figure 1, or reduced to increase the unit wall pressure as shown in Figure 4.

In Figures 3 and 5 I have illustrated a modified separator which is adapted to reduce the friction or drag between the side rails 7 and 8 and the separator 9. Furthermore, the separator shown in Figures 3 and 5 will prevent relative rotation of the side rails and the separator thus assuring a proper conforming and engagement of the side rails with the cylinder wall at all times.

A series of projections 18 are formed on the outer surfaces of the flanges 14' and 15'. These projections are very slight, extending from .003" to .006" beyond the surface of the flange. Preferably they are formed by indenting the inner side of the flanges 14' and 15', as is clearly seen in Figures 3 and 5. As these projections are spaced around the entire separator ring, the inner edges of the side rails 7' and 8' engage the separator only at these projections and thus the friction or drag between the parts is reduced. The projections 18 also serve to prevent relative rotation of the side rails and the separator after the ring is installed in a cylinder. This action is seen in Figure 3 and results from the fact that the humps of the expander 10 will distort the relatively shallow and flexible, flanged channel separator to cause the projection 18 which is disposed between the ends of a side rail to project slightly beyond the inner corner of the adjacent side rail end. This projecting element 18 will act as an abutment to prevent rotation of the side rail relative to the separator ring. Only a very few thousandths of an inch projection are necessary to prevent rotation and this amount of distortion can occur without interfering in any way with the normal operation of the ring elements.

In Figures 7 and 8 a modified form of separator is shown in which a ribbon of metal is bent as indicated to provide spaced U-shaped projections 19 connected by wider portions 20 having slight projections 21 formed thereon and being provided with holes 22 extending therethrough. A separator of this nature, split in the same manner as the separator shown in Figure 5, will also serve to space and support a pair of side rails.

Similarly, the separator of Figures 9 and 10 consists of a ribbon 23 of steel having tongues punched out and curled into projecting rings 24. The punching of the tongues leaves slots 25 through the ribbon 23 through which oil may escape and the axial dimension of the coiled projections formed by the punched out tongues is made substantially equal to the width of the channel separator 9 from the outside of the side 12 to the outside of the side 13. Substantially the same support will be provided for the side rails, as is seen in Figures 1 and 3.

It will be understood that, when the separators shown in Figures 7 to 10 are used, a corrugated expander will engage the inner surface of the separator in the same manner as shown in Figures 1 and 2.

In replacing piston rings in worn cylinders about the maximum which is encountered in practice is a cylinder .060" oversize in diameter. Prior to my present invention replacement piston rings have been made in various sizes to fit various degrees of oversize. For example, they are made in standard diameter, and in oversizes of .010", .020", .030", etc. Another procedure is to supply shims which can be disposed in the bottom of the piston ring groove to increase the effective diameter of the ring. As previously noted, with my present construction I am able to accommodate, with a single ring size, all conditions from standard to .060" oversize. I preferably proportion my corrugated expander spring so that, in the usual automotive sizes, the side rail rings will protrude or extend from the side of the piston from .075" to .090" when placed in the shallowest ring groove encountered. As oversize pistons normally have deeper than standard ring grooves, a .060" oversize piston having a ring groove about .030" deeper than standard, my ring, under such conditions, will protrude from the piston from .044" to approximately .060".

By providing my ductile metal resilient, light weight separator ring which engages and supports a pair of side rail rings, my oil drain ring assembly has sufficient flexibility to accommodate itself to the particular size of cylinder and piston in which it is installed in such a manner that I find that I am able to fit all cylinders of a given size from standard diameter to approximately .060" oversize with but a single size of piston ring. The advantages of this feature of my development will appear when it is considered that the necessarily extremely large inventory of fractional oversize piston rings, which previously had to be carried in stock by each dealer, is completely eliminated.

My ductile metal resilient flanged channel separator provides a very flexible but ample support for the side rails which permits the corrugated expander to conform the side rails accurately to out-of-round cylinders. Cast iron separators cannot be satisfactorily employed in my improved form of ring as they necessarily must be relatively very thick and heavy to have sufficient strength to permit them to be handled and installed without breakage. This thickness of a cast iron separator prevents the effective use of an expander spring because of the fact that a cast iron separator would take up too much room in a standard ring groove, it being remembered that one of the important uses of my improved construction is replacing piston rings in standard automobile engines.

Furthermore, in my construction in which a pair of side rails are supported around their entire circumference on the flanges of a flexible steel separator, I obtain a substantially perfect distribution of the radial outward pressure from the expander spring. The expander spring humps contact against the separator only and the width of the separator flanges is sufficiently great to prevent jamming and excessive wear.

I have also found that my improved oil drain ring is exceptionally free from clogging and sticking due to carbon formation on the ring. Difficulty has been encountered with previous oil drain rings due to the apertures in the ring becoming so filled with carbon deposits that the flow of oil therethrough is either completely stopped or seriously interfered with. My thin steel channel section separator, having elongated holes 16' through the vertical wall thereof, does not tend to collect carbon in the manner that similar holes through relatively thick cast iron ring elements do. I believe that my improved results insofar as clogging on account of carbonization is concerned are due to the thinness of the metal making up the separator which, as noted above, is preferably only .012" to .014" thick.

Although I have described the illustrated embodiments of my invention in considerable detail it will be understood that modifications and variations may be made in the specific form and arrangement of parts making up my improved oil drain piston ring, and I do not, therefore, wish to be limited to the particular forms of my invention herein shown and described, but claim all embodiments thereof coming within the scope of the appended claim.

I claim:

An oil ring for pistons comprising a pair of spaced split thin ductile metal side rail rings, a split separator ring of thin ductile metal between said side rails and having axially extending portions disposed adjacent the inner edges of said side rails, said axially extending portions of said separator having a plurality of uniformly circumferentially spaced projections contacting with said inner edges of said side rails, and means for exerting distributed outward radial pressure on said separator ring only.

DEAN M. SOLENBERGER.